United States Patent [19]
Lange

[11] Patent Number: 5,238,560
[45] Date of Patent: Aug. 24, 1993

[54] WASHABLE FILTER

[76] Inventor: Lutz Lange, Tiefenbroicher Str. 57, 4030 Ratingen 4, Fed. Rep. of Germany

[21] Appl. No.: 936,171

[22] Filed: Aug. 27, 1992

[30] Foreign Application Priority Data

Aug. 30, 1991 [DE] Fed. Rep. of Germany ....... 4128843

[51] Int. Cl.⁵ .............................................. B01D 36/04
[52] U.S. Cl. ..................................... 210/265; 210/269; 210/283; 210/284; 210/286
[58] Field of Search ............... 210/258, 265, 266, 269, 210/275, 283, 284, 286, 290, 293, 416.1

[56] References Cited

U.S. PATENT DOCUMENTS

| 904,389 | 11/1908 | White | 210/286 |
|---|---|---|---|
| 3,111,487 | 11/1963 | Martin | 210/136 |
| 3,239,061 | 3/1966 | Horning et al. | 210/80 |
| 3,534,855 | 10/1970 | Guillerd et al. | 210/73 |
| 3,886,071 | 5/1975 | Weis | 210/108 |
| 4,246,119 | 1/1981 | Alldredge | 210/279 |
| 4,578,187 | 3/1986 | Alhauser | 210/286 |

FOREIGN PATENT DOCUMENTS

| 135550 | 11/1902 | Fed. Rep. of Germany . |
|---|---|---|
| 1033184 | 7/1958 | Fed. Rep. of Germany . |
| 1183050 | 12/1964 | Fed. Rep. of Germany . |
| 1962881 | 6/1967 | Fed. Rep. of Germany . |
| 1536867 | 2/1970 | Fed. Rep. of Germany . |
| 7434785.6 | 7/1975 | Fed. Rep. of Germany . |
| 7816518 | 9/1978 | Fed. Rep. of Germany . |
| 2848660 | 11/1979 | Fed. Rep. of Germany . |
| 3124556 | 1/1983 | Fed. Rep. of Germany . |
| 3214419A1 | 10/1983 | Fed. Rep. of Germany . |
| 3240813A1 | 5/1984 | Fed. Rep. of Germany . |
| 3245093A1 | 5/1984 | Fed. Rep. of Germany . |
| 8711511.5 | 11/1987 | Fed. Rep. of Germany . |

OTHER PUBLICATIONS

Pfaudler-Werke AG Schwetzingen, *Automatischer Pfaudler Schwerkraftfilter*, Advertising Brochure No. 602, 1962, pp. 1–8.

"Johnson Stützstabsiebe... Hochfest, Haltbar, einfach zu installieren", *Chemie-Ing.-Techn.*, 1975, 47(22):A 655.

*Primary Examiner*—Ivars Cintins
*Attorney, Agent, or Firm*—Cohen, Pontani, Lieberman, Pavane

[57] ABSTRACT

A washable filter for purifying water includes an upwardly open, upright vessel. A raw water inlet is provided above a filtration zone in the vessel. A sedimentation chamber is arranged underneath the filtration zone. A vertical wall arranged above the sedimentation chamber divides the filtration zone into two filter chambers, such that the filter chambers are connected to each other only through the sedimentation chamber. One of the filter chambers is arranged below the inlet and an outlet for the filtered water is arranged above the other of the filter chambers. A heavy material pump connected to a sludge outlet pipe is arranged in the sedimentation chamber.

11 Claims, 3 Drawing Sheets

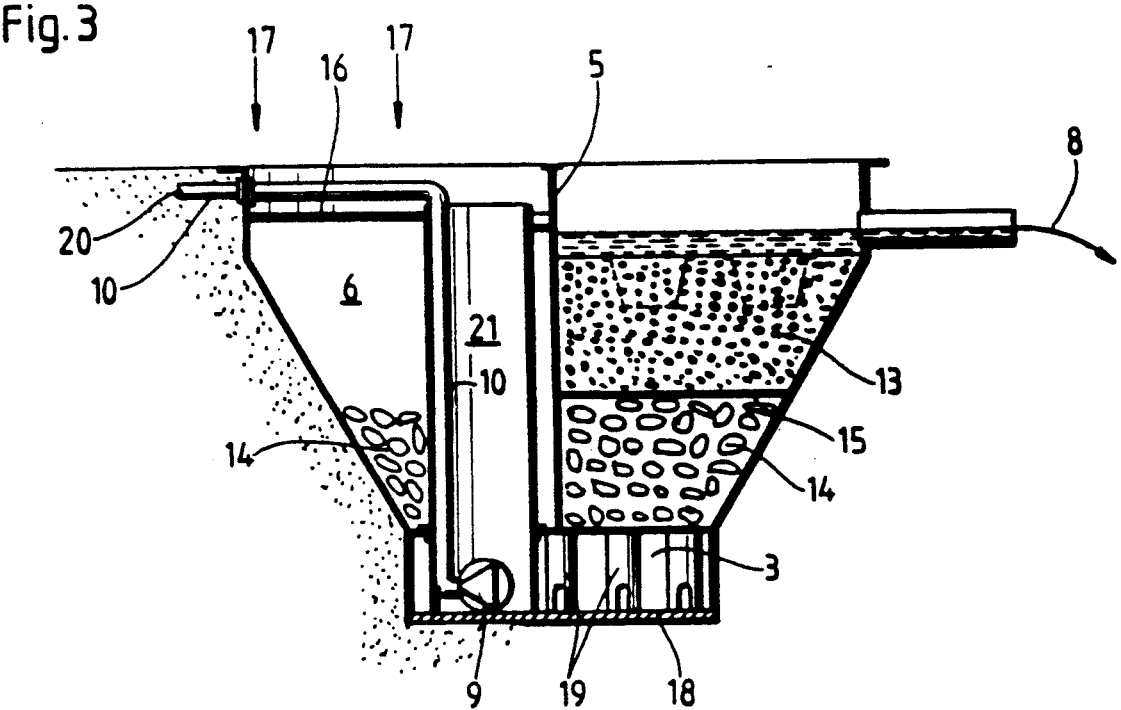
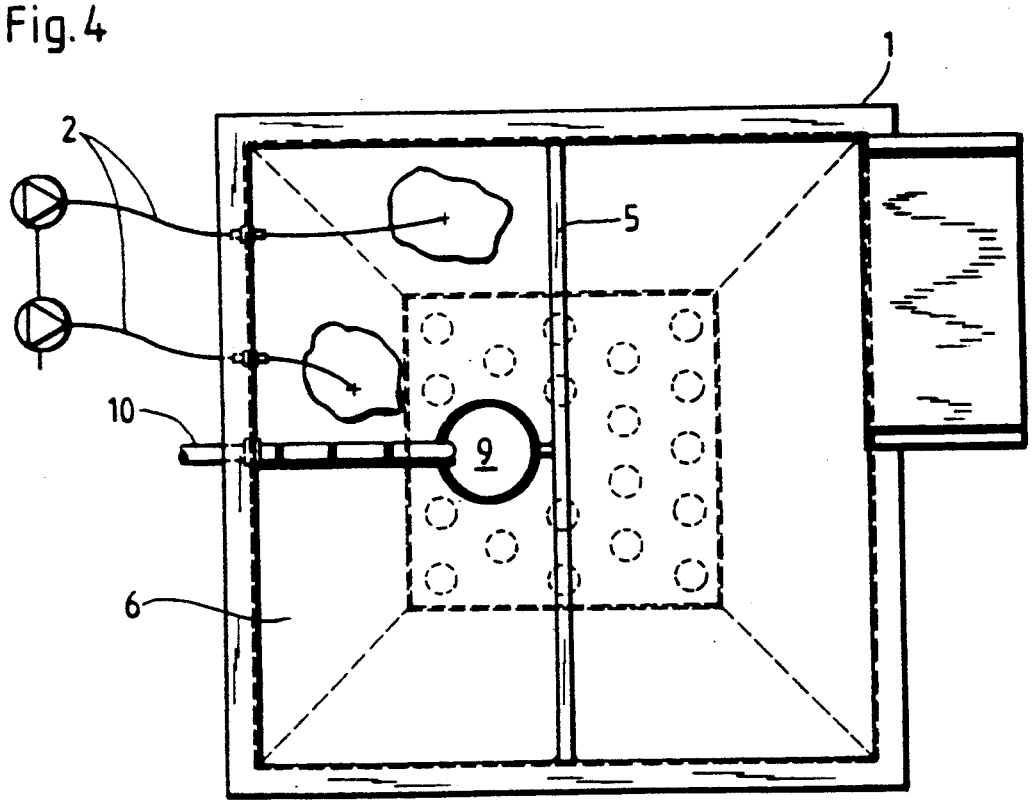

WASHABLE FILTER

BACKGROUND OF THE INVENTION

1. Field of the Invention

The present invention relates to a washable filter for purifying water.

2. Description of the Related Art

For filtering water filters are used in which the turbid water is led in a downward or upward direction through a filtration zone filled with filter material. Sand, gravel or also activated carbon are used as filter materials. Usually such filters are periodically cleaned by means of so-called backwashing. That means, rinsing liquid is sent in reverse direction to the filtration flow through the filter material in order to liberate the latter from sludge.

Examples of such arrangements are described in U.S. Pat. Nos. 3,886,071, 4,246,119, 3,111,487, 3,239,061, DE-1033 184, DE-11 83 050, DE 3245 093 and DE 19 62 881. All these arrangements deal with filters in which the water to be purified is sent through a filter layer from top to bottom during the filtration. In order to clean the filter layer, rinsing liquid is again sent in reverse direction, i.e. from bottom to top, through the filter layer.

Such arrangements have considerable disadvantages. The sludge accumulating in a sedimentation chamber, which is arranged underneath the filtration layer, can only be removed with difficulty by means of this process. This is because the sludge must be forced through the entire filter bed at first. That means that a considerable pressure and/or expenditure of time is necessary when cleaning. Moreover, the filtration cannot be continued during the desludging process.

Furthermore such backwash filters are not suitable for the construction of several filter layers with different grain sizes. This is because the fine grain is taken upwardly during the backwash process while the coarse grain is progressively moved to the lower layers. After several rinsings, there is an outer layer on the top of the filter bed which consists of very fine grains and clogs very quickly during subsequent filtration. Consequently, the entire remaining filtration layer under the fine grain layer hardly has any effect.

A further disadvantage of the reverse flow washing lies in the fact that the arrangement of the microorganism flora within the filter layer is destroyed to a large extent. During the filtration process, an accumulation of microorganisms of different types is formed in dependence on the contaminant composition of the water which is changed under the influence of these microorganisms. It follows that the microorganism population is changed with progressive filtration distance and thus the different contaminant fractions are gradually removed from the water. In this connection, the oxygen gradient being formed also has a considerable influence. Thus, a high oxygenation takes place in the upper parts where the raw water is supplied while the oxygen content is lower in the lower layers. For this reason, preferably microaerophilic microorganisms settle in these layers. Reverse flow washing destroys the order of this microorganism flora. It follows that with the beginning of each new filtration phase a certain preparatory stage has to pass until the microorganisms have found their order again.

From U.S. Pat. No. 3,534,855, DE 15 36 867 and DE 28 48 660 processes are known in which the liquid to be cleaned is forced through the filter from bottom to top and rinsing occurs from top to bottom. It is true that these processes have the advantage that sludge possibly settling in the sedimentation chamber below the filtration layer is drawn off by the outlet arranged below. However, the further disadvantages of the reverse flow washing as mentioned above remain in existence to a large extent. In addition, the outlet positioned below is not suitable for filter arrangements which are to be embedded in the soil as this is the case with pond filters, for instance. Piping within the soil requires additional construction and service expenses. On the other hand, a direct outlet of the activated sludge into the soil is not recommendable, because this process would quickly lead to a poisoning and clogging of the soil surrounding the filter.

Finally, from DE-13 55 550 a device for filtering water is known in which water is applied on the filter material in the direction of filtration in order to wash. For this, a water supply pipe is arranged above the filtration layer. At the end of this pipe, rotatable spray arms are positioned. During the washing process water is now applied from these spray arms onto the filtration layer. In doing so, the spray arms are permanently rotated and slowly driven into the filter material at the same time.

It is true that this filter system does not have the above-mentioned disadvantages when washing. But the slow rotation of the spray arms only works if filter sand is used. However, even then there is the risk that the nozzles of the spray arms will gradually clog. If other materials are used, such as coarse-grained gravel, the spray arms can only be moved with difficulty. Moreover there is the risk that the spray arms will be damaged. When using sensitive filter materials, such as porous clay, there is further the danger that these materials clog and the desired filtration effect is lost. Furthermore the construction of such a rotatable device requires quite a constructional expenditure. In addition to this, the energy expenditure necessary for the rotation needs to be considered.

Finally, also this system results in a destruction of the arrangement of the microorganism flora. Due to the permanent rotation of the spray arms into the filtration layer, the latter is constantly agitated. Therefore, each beginning of a filtration cycle requires a certain starting time until the microorganism population has found its order again.

DE 32 14 419 describes an arrangement consisting of a closed vessel which is equipped with filter devices. At first, the raw material is conveyed into a filter preliminary chamber via a supply pipe arranged in an upper region. The filter preliminary chamber surrounds a filter bed which is separated from the chamber by a perforated layer. The water from the filter preliminary chamber enters the filter layer at the side. The filtered water is drained via a pipe arranged below. Additional ventilation devices are provided in the lower part of the filter preliminary chamber for constantly mixing the water in the chamber.

Considerable disadvantages result from the design of this arrangement. Thus, the filtration capacity and the filtration result respectively are very unsteady, since the filtering time in the filter layer depends on where the water to be filtered enters the perforated layer. The water entering the lower part has to cover a considerably shorter distance to reach the drain pipe than the water entering the upper part.

Moreover, due to the constant turbulence caused by the ventilation devices in the form of air nozzles, a sedimentation of the sludge is not possible to a sufficient extent before the water enters the filter layer. Consequently, a large number of the sludge particles from the preliminary filter directly reach the filter layer and thus contribute to a shorter service life.

Finally, it remains to be noted that the sludge drawoff is diposed in the lower part of the arrangement. The same applies to the drain pipe and the supply pipe for backwash water. For this reason, the arrangement cannot be embedded in soil. Additionally, with the backwash pipes positioned below, a cleaning of the filter layer can only be achieved in reverse direction to the filtration flow. This means again that it is not possible to clean the arrangement during running operation.

DE 31 24 556 discloses a special filter for purifying waste water contaminated by light liquids. In principle, the reference deals with a separating device which is only filled with a filter mass. Here, the following processes take place in the same vessel: on the one hand, gravity separation and the storage of the separated light liquid and, on the other hand, coalescence filtering. Thus, in this case, the vessel does not consist of two filter chambers. The liquid to be cleaned is rather led via a supply pipe positioned below and an ascending pipe to a filter layer, in which the liquid flows from top to bottom. From a chamber positioned below, the water then reaches a special drain chamber.

However, the effect of carrying out a filtering with interposed sedimentation is not achieved with this arrangement. It is rather the purpose of the arrangement to collect light liquid on the surface in the upper part of the device. During continued operation of the device, a light liquid layer growing thicker and thicker collects on the surface which extends into the filter filling. It follows that light liquid reaches the drain chamber. At that moment, however, a float provides for a closure of the drain.

The cleaning of the arrangement necessary from then on is effected by means of backwash pipes positioned below; i.e. also in this arrangement, cleaning is carried out in reverse flow. Thus, no indication can be taken from DE 31 24 556 that a biological cleaning arrangement can be operated with this system and that in doing so, cleaning can be achieved in parallel flow during running operation. Apart from that, this arrangement can also not be embedded in soil since the supply pipe and the backwash pipes are mounted in the lower region.

Finally German utility model 7816518 relates to a dripper being composed of only one filter chamber. In this case, the water supplied via a pipe from below is distributed on the surface of a filter layer by means of nozzles. The water flows through a filter layer from top to bottom and is finally used again via another pipe of the arrangement.

Thus, the principle of cleaning by means of a filter layer with interposed sedimentation cannot be taken from this arrangement. Rather, from the manner in which the removal of the filter mass can be facilitated, it is clear that this publication starts from the fact that cleaning is not possible during running operation.

SUMMARY OF THE INVENTION

It is the object of the present invention to make available a washable filter for purifying water including an upright vessel having an inlet for raw water in its upper region, a filtration zone which has two filter chambers positioned below the upper region and a sedimentation chamber arranged underneath the filtration zone, the first chamber being disposed below the inlet, which does not have the aforementioned drawbacks.

In accordance with the present invention, a) the top of the vessel is open; b) a vertical wall which is arranged above the sedimentation chamber divides the filtration zone into two filter chambers such that the latter are only connected to each other via the sedimentation chamber; c) the outlet for the filtered water is disposed above the second chamber; and d) a heavy material pump having a sludge outlet pipe is positioned in the sedimentation chamber.

According to another feature of the invention, the sedimentation chamber is preferably separated from the two filter chambers by a perforated plate. The perforated plate is additionally secured against bowing or bending by means of supports. The floor of the sedimentation chamber can be of any material. It only has to be stable enough as to resist the pressure of the supports with the filtration layers lying above. For example, in the simplest case, concrete can be used.

According to the invention, substrates customary in trade are used as filter substrates or filter materials. In the simplest case, this may be gravel. Layers with different substrates or grain sizes can also be used. For example, a layer with fine gravel and a layer with coarse gravel can be provided.

If desired, these different layers can be separated from each other by subdivision segments, such as perforated plates or filter mats. In the area of the water inlet, a filter net can additionally be arranged.

In order to rinse the filtration device, pipes are disposed above the filtration layers from which water is sprayed on the filtration zone under high pressure. In the simplest case, for example with respect to the arrangement of garden pond filters, this can also be achieved with a common garden hose. By means of this spraying of rinsing water, the sludge is forced into the lower sedimentation chamber from where it is taken outside the filtration vessel using a sedimentation pump.

For this purpose the sedimentation pump is connected to the top side of the filter device via a vertical duct. In the vertical duct, a pipe is disposed for the removal of sedimentation material.

The advantage of the arrangement according to the invention lies in the fact that an optimum liberation of the filter material from sludge is guaranteed at intervals without destroying the arrangement of the bacteria flora. This is because, in contrast to the prior art, the arrangement operates in parallel flow. Also, an additional destruction of the filtration substrate caused by agitating does not take place so that a damage of the filtration substrate and the bacteria flora does not occur. Through the use of the heavy material pump in the sedimentation chamber, the removal of the sludge is additionally accelerated as compared to the prior art.

The arrangement of the heavy material pump additionally has the advantage that the sludge accumulating during the filtration process can be removed from the sedimentation chamber without interrupting the filtration process under any circumstances. Finally, all supply pipes and drain pipes for the raw water, filtrate and sludge are arranged at the upper edge of the vessel. Accordingly, the arrangement is suitable for embedding in the ground or soil because there are no pipe connections in the lower region of the vessel wall. Thus, the arrangement can be optically integrated into the landscape at any time. In particular with respect to pond filters, this can have considerable advantages in comparison to the closed systems common so far.

The optical integration into the landscape can further be improved in that plants are put in the upper filter substrate layer. They cause an additional filtration according to the example of the known root area clarification plant.

A further advantage of the arrangement according to the invention is the use of very simple components as well as their easy handling. Thus, any materials, such as plastic materials for example, can be utilized for the vessel. Moreover, concrete can be used for larger arrangements. Reasonably priced articles which are customary in trade can also be used for the pump. Finally, the possibility of washing the filter layer by means of a garden hose in the simplest case even guarantees the applicability for the hobby gardener.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWING

In the Drawing:

FIG. 3 is a sectional view of the arrangement without fine gravel layer in the supply;

FIG. 4 is a top view of the arrangement according to the invention;

DESCRIPTION OF THE PREFERRED EMBODIMENTS

Figure 1:
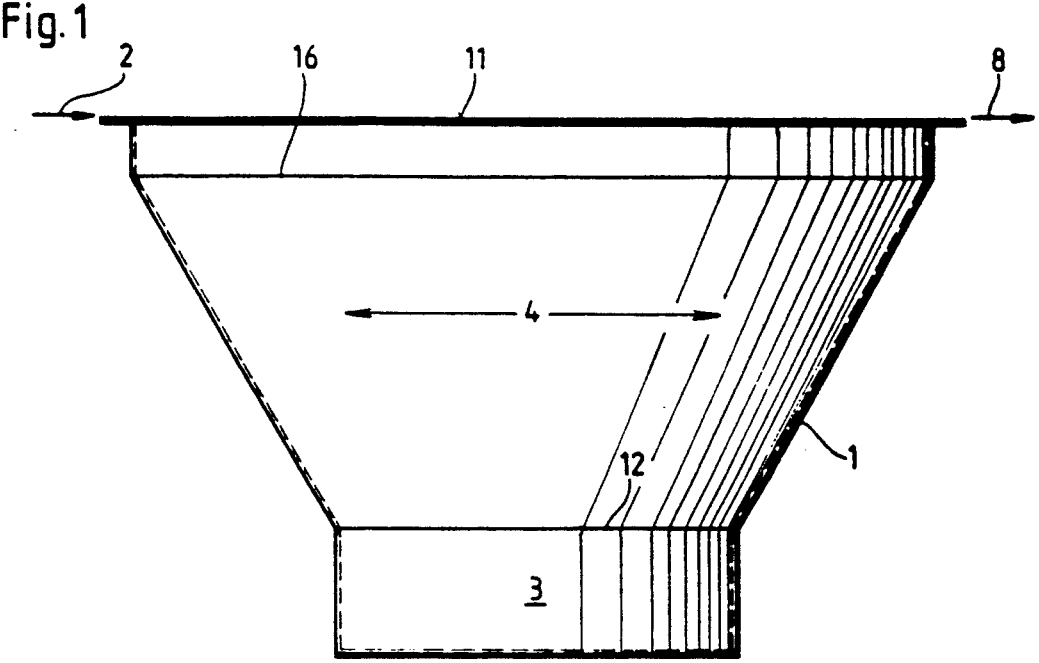
FIG. 1 is a side view of the arrangement according to the invention.
Figure 2:
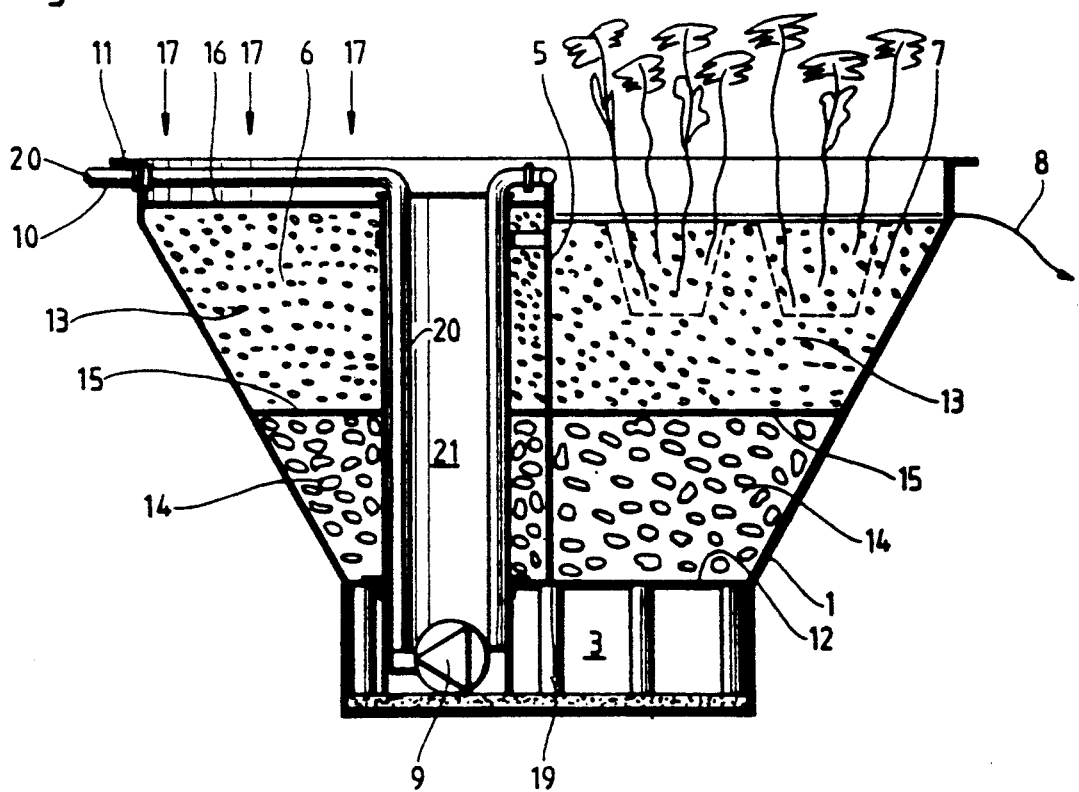
FIG. 2 is a sectional view of an embodiment of the arrangement of FIG. 1 showing structural details.
Figure 5:
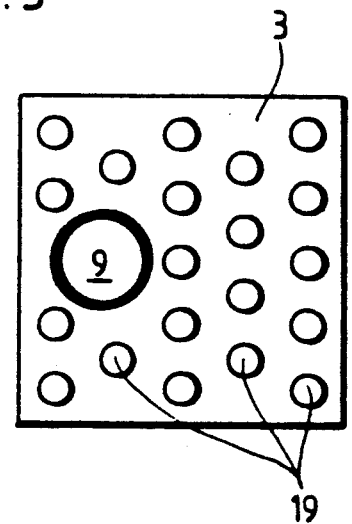
FIG. 5 is a top view of the sedimentation chamber.
Figure 6:
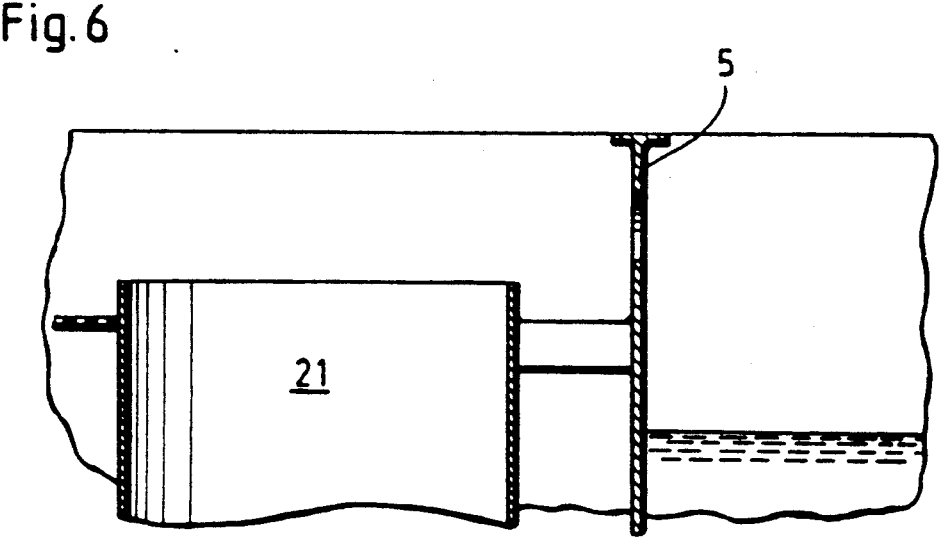
FIG. 6 is a partial sectional view, on a larger scale, showing the upper part of the separating wall and the vertical duct for heavy material.

In order to be cleaned, the raw water is conveyed to a chamber 6 via a supply pipe 2. In the embodiment of the invention according to FIG. 2, this chamber 6 includes a filter layer equipped with a fine-grained gravel layer 13 in its upper region and a coarse-grained layer 14 positioned in its lower region. Both layers are separated from each other by a filter mat 15. The surface of the gravel layer 13 is additionally covered with a filter net 16.

The raw water supplied via the inlet 2 seeps through the filter layers 13 and 14 of the chamber 6 into the sedimentation chamber 3. Correspondingly, in the case of the embodiment shown in FIG. 3, the raw water only soaks through the coarse gravel layer 14. Through the microorganisms adhering to the gravel, a continual conversion of the dirt particles contained in the raw water is effected. A vertical wall 5 separates chamber 6 from another filtration chamber 7. Due to the reversal of the water flow direction when the water flows from chamber 6 to chamber 7, sludge particles deposit on the floor 18 of the sedimentation chamber 3. The floor 18 of the sedimentation chamber is composed of concrete in the illustrated example according to the invention. On this concrete layer, supporting columns 19 are arranged on which, in turn, the plate 12 is disposed. For this, screening sheets or perforated plates of a sufficient stability which are customary in trade can be used.

The water flowing through the sedimentation chamber and coming from chamber 6 rises upwardly in the filtration chamber 7. In doing so, it is subjected to a further continuous cleaning. Finally, purified water runs off out of the filtration vessel via an outlet 8.

A heavy material pump 9 is arranged in the sedimentation chamber. With this pump, sludge can be transported from the sedimentation chamber outside via the drain pipe 10 arranged in the vertical duct 21. The sludge drawoff 20, as well as the pipe supply for the raw water 2 and the outlet pipe 8 for the filtrate, are arranged at the upper vessel edge 11 of the filtration device so that there are no connections at all in the lower region of the filtration vessel. Accordingly, the arrangement can also be embedded in the ground at any time.

In order to rinse the filtration layers, water is sprayed from above on the filtration substrate under high pressure via the pipes 17. In doing so, the sludge is forced in the direction of filtration through the chamber 6 into the sedimentation chamber. By means of the heavy material pump, sludge is directly drained from there outside. In the same manner, it is basically possible to clean chamber 7 which is separated from the chamber 6 through the separating wall 5, because, with this special arrangement, less sludge deposits in the filter layer of chamber 7 than in chamber 6. Moreover, water coming from the sedimentation chamber has a lower content of dirt and oxygen. Therefore, the dirt gradient as well as the oxygen gradient are less marked in the chamber 7 than in the chamber 6. Accordingly, a less strict arrangement of the microorganism flora arises in chamber 7. For this reason, too, the rinse pipes 17 can be disposed above the chamber 7 so that the rinse water is forced through the filtration layer in reverse direction to the filtration flow.

From the above it is apparent where the decisive differences from the prior art can be seen. Thus, according to the invention, it is essential that a vertical wall which is arranged above the sedimentation chamber divides the filtration zone into the two filter chambers, such that the chambers are only connected to each other via the sedimentation chamber.

With this arrangement it is achieved that the raw water conveyed to the chamber 6 via the inlet 2 seeps through the filter layer into the sedimentation chamber 3. In doing so, a first purification of the raw water takes place. Due to the reversal of the water flow direction, the sludge particles deposit on the floor 18 of the sedimentation chamber. Subsequently, the water flowing through the sedimentation chamber rises again in the chamber 7 and in doing so, is subjected to a subsequent filtering. The purified water leaves the filtration vessel via the outlet 8.

With the heavy material pump 9 arranged in the sedimentation chamber, sludge can be transported from the sedimentation chamber outside via the drain pipe 10. The arrangement of this pump has the advantage that sludge accumulating during the filtration process can be removed from the sedimentation chamber without interrupting the filtration process.

The described order of the individual filtration sections with an upstream filter layer, with a downstream sedimentation chamber as well as a subsequent filtration layer following thereto has also proved to be particularly effective because with this arrangement less sludge deposits in the chamber 7 and for this reason this chamber reaches a very long service life. Therefore, its cleaning as well as the possibly required interruption of the filtration process is only necessary at intervals which could not be achieved according to the prior art.

It has also proved advantageous in the arrangement according to the invention that cleaning is possible during operation because, in contrast to the prior art, the chamber 6 can be cleaned in parallel flow. The sludge forced out of the filter layer can be removed from the sedimentation chamber by means of the heavy material pump without interrupting the operation of the device. Accordingly, the arrangement can be operated with a very long service life since a cleaning of the second filter chamber 7-as described above-only has to be carried out at very long intervals.

It should be understood that the preferred embodiments and examples described are for illustrative purposes only and are not to be construed as limiting the scope of the present invention which is properly delineated only in the appended claims.

What is claimed is:

1. A washable filter arrangement for purifying water, the filter arrangement comprising an upwardly open, essentially vertical vessel, the vessel having an upper region and a bottom, the vessel having an inlet for water to be purified, the inlet being mounted in the upper region of the vessel, a sedimentation chamber at the bottom of the vessel, a filtration zone between the upper region and the sedimentation chamber, a vertically extending wall mounted above the sedimentation chamber, the vertically extending wall dividing the filtration zone into first and second filter chambers, such that the first and second filter chambers are in communication with each other only through the sedimentation chamber, the first filter chamber being located underneath the inlet, an outlet for filtered water being mounted above the second filter chamber, a heavy material pump being mounted in the sedimentation chamber, and a sludge outlet pipe connected to the heavy material pump.

2. The filter arrangement according to claim 1, wherein the sludge outlet pipe extends from the heavy material pump to an upper edge of the upper region of the vessel and outside the vessel from the upper edge.

3. The filter arrangement according to claim 1, comprising a perforated plate separating the sedimentation chamber from the first and second filter chambers.

4. The filter arrangement according to claim 1, comprising a plurality of filter substrates disposed in layers in the first and second filter chambers.

5. The filter arrangement according to claim 4, wherein the filter substrates are of gravel.

6. The filter arrangement according to claim 5, wherein upper substrate layers in the first and second filter chambers are of fine-grained gravel and lower substrate levels in the first and second filter chambers are of course-grained gravel.

7. The filter arrangement according to claim 4, wherein the filter substrate layers are separated from each other by a water-permeable layer.

8. The filter arrangement according to claim 7, wherein the water-permeable layer is a perforated plate.

9. The filter arrangement according to claim 7, wherein the water-permeable layer is a filter mat.

10. The filter arrangement according to claim 4, wherein the filter substrate layers have upper surfaces, comprising filter nets placed on the upper surfaces.

11. The filter arrangement according to claim 1, comprising at least one pipe for wash water supply arranged above the first filter chamber.

* * * * *